Nov. 3, 1931.  A. F. MASURY  1,830,399
ENDLESS TRACK
Filed Jan. 23, 1931  2 Sheets-Sheet 1
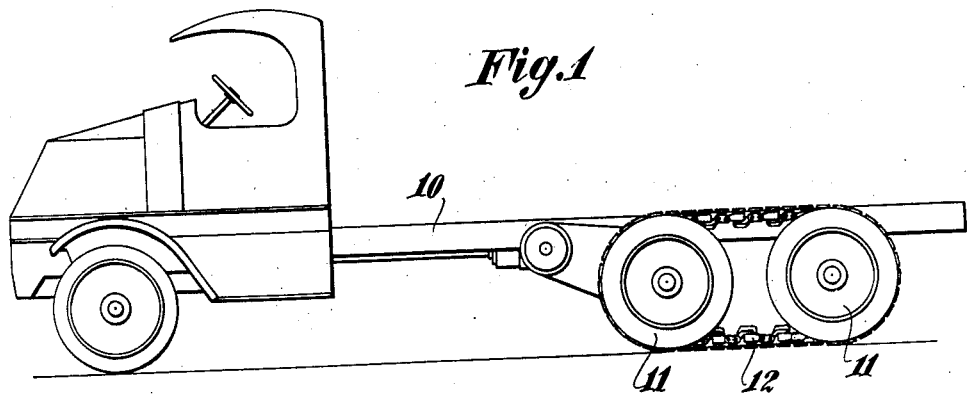
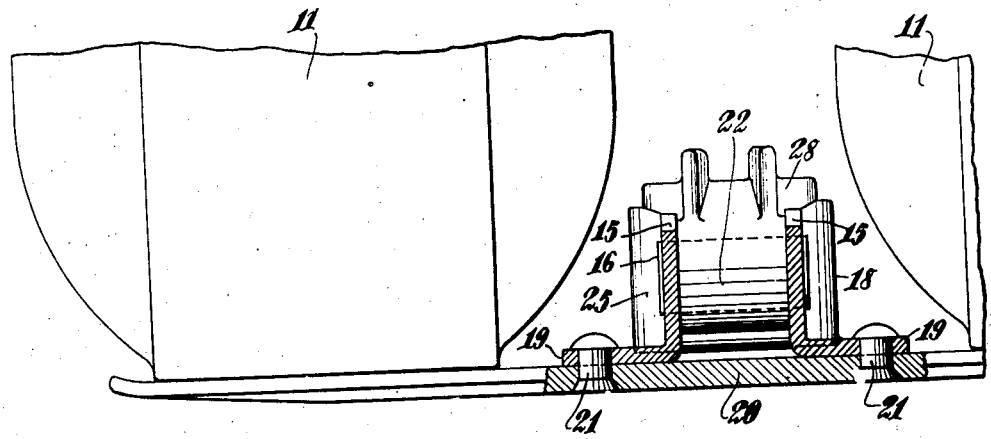
INVENTOR
Alfred F. Masury,
BY
Redding, Greeley, O'Shea & Campbell
HIS ATTORNEYS

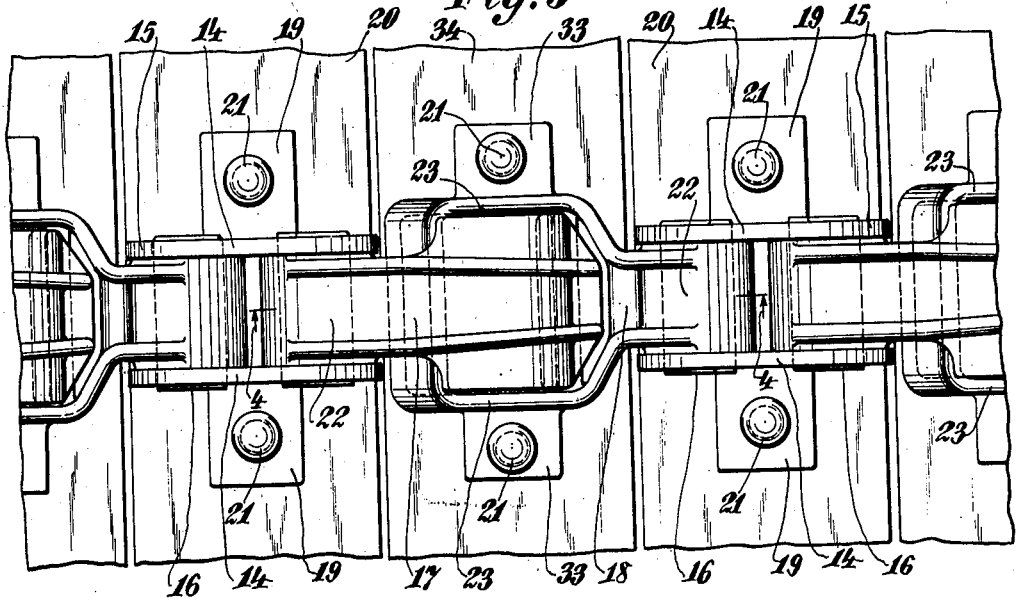
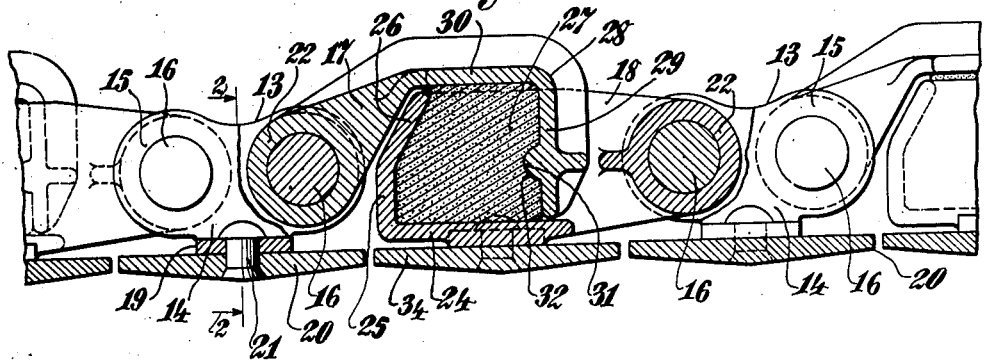

Patented Nov. 3, 1931

1,830,399

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

ENDLESS TRACK

Application filed January 23, 1931. Serial No. 510,602.

The present invention relates to endless tracks for motor vehicles and embodies, more specifically, an improved track which is adapted to be used on motor vehicles of the six-wheel type, wherein the two rear wheels at either side thereof are to be connected by an endless track to improve the traction.

In existing constructions of this character, the track elements have been made of cast steel and are found to be very heavy. As a result, the endless tracks are difficult to install and remove and furthermore add considerable weight to the vehicle and result in loss of power. The present invention seeks to provide a track structure which is adapted for use in connection with vehicles, wherein the track may be mounted and dismounted at will, the structure being such that an inherent elasticity exists between the articulated elements thereof, at the same time providing a track which is sufficiently strong to withstand the stresses imposed thereon during service.

A further object of the invention is to provide a track structure of the above character wherein the elements are so constructed as to eliminate, in a large measure, the objectionable weight of existing tracks without sacrificing any of the strength and wearing qualities thereof.

Further objects, not specifically enumerated above, will be apparent as the invention is described in greater detail in connection with the accompanying drawings, wherein:

Figure 1 is a view in side elevation, showing a vehicle upon which a track constructed in accordance with the present invention has been mounted.

Figure 2 is a view in section, taken on line 2—2 of Figure 4, and looking in the direction of the arrows.

Figure 3 is an inner plan view showing a section of the endless track shown in Figures 1 and 2.

Figure 4 is a view in side elevation, partly broken away and in section on line 4—4 of Figure 3, and looking in the direction of the arrows.

With reference to the above drawings, a vehicle frame 10 is provided with a plurality of wheels 11 upon opposite sides thereof, as clearly shown in Figure 1. One or both of these wheels may be driven as desired and in the event that only one wheel is driven the other wheel may be removably mounted upon the wheel in any well known fashion.

Over the pair of wheels at either side is an endless track 12 which is formed of a plurality of alternate links 13 having spaced side members 14 formed with eyes 15. Pins 16 are mounted in the eyes and are adapted to journal the adjacent ends of links 17 and 18. The respective links 13 are formed with plates 19 upon which pads 20 may be secured by means of rivets 21. The pads 20 may be formed of any desired substance.

Between the respective links 13, the links 17 and 18 are mounted, each link 17 and 18 being formed with an eye 22 which is adapted to be hinged upon the pins 16 carried by the links 13. The link 18 is formed with spaced sides 23 having a bottom wall 24 and an end wall 25. The end wall preferably slopes upwardly toward the eye 22 of the link 18, as shown at 26 in Figure 4. Between the sides 23, bottom wall 25 and end wall 25 and 26, a pocket or seat is provided which is adapted to receive a rubber block 27.

The cooperating links 17 are formed with a hook-shaped extension 28 which has a downwardly extending bearing portion 29 and a horizontal bearing portion 30. The downwardly extending portion is preferably formed with a longitudinal rib 31 which is adapted to engage a cooperating groove 32 formed on the block 27, as shown in Figure 4.

The bottom portions of links 18 are formed with arms 33 which are adapted to be secured to bearing pads 34 similar to the pads 20 and thus form the endless track construction shown in Figures 1, 3, and 4.

It will be obvious that the track has inherent elasticity by reason of the provision of the rubber blocks 27 between the links 17 and 18 and the flexibility of the articulated structure is thus materially increased. By reason of these characteristics, the links and associated elements may be formed of comparatively light material to reduce the weight of the track without decreasing the strength thereof.

While the invention has been described with specific reference to the accompanying drawings, it is not to be limited, save as defined in the appended claims.

I claim as my invention:

1. An endless track for motor vehicles including a plurality of pivot links, a recessed link pivoted to each pivot link, blocks of yielding non-metallic material in the recesses, a link pivoted to each pivot link and having a seating surface adapted to engage the yielding block carried by the adjacent recessed link, and bearing pads secured to the pivot links and the recessed links.

2. An endless track for motor vehicles including a plurality of pivot links, an apertured link pivoted to each first link, blocks of yielding non-metallic material carried by the apertured links, a link pivoted to each first link and having a hooked extension for engaging an adjacent block, and bearing pads on the first and second links.

3. An endless track for motor vehicles including a plurality of pivot links, an apertured link pivoted to each first link, said apertured links each being formed with a bottom wall and a sloping side wall, a block of yielding non-metallic material carried by each apertured link, a link pivoted to each first link and having a hooked extension for engaging an adjacent block, and bearing pads on the first and second links.

This specification signed this 21st day of January A. D. 1931.

ALFRED F. MASURY.